(12) United States Patent
Piva

(10) Patent No.: US 11,707,866 B2
(45) Date of Patent: Jul. 25, 2023

(54) PROCESS FOR DRYING GRANULAR POLYMERIC MATERIAL AND PLANT OPERATING ACCORDING TO SAID PROCESS

(71) Applicant: Pegaso Industries S.p.A., Borgoricco (IT)

(72) Inventor: Rinaldo Piva, Borgoricco (IT)

(73) Assignee: PEGASO INDUSTRIES S.P.A., Borgoricco (IT)

( * ) Notice: Subject to any disclaimer, the term of this patent is extended or adjusted under 35 U.S.C. 154(b) by 43 days.

(21) Appl. No.: 16/605,813

(22) PCT Filed: Apr. 19, 2018

(86) PCT No.: PCT/IB2018/052704
§ 371 (c)(1),
(2) Date: Oct. 17, 2019

(87) PCT Pub. No.: WO2018/193396
PCT Pub. Date: Oct. 25, 2018

(65) Prior Publication Data
US 2021/0276224 A1    Sep. 9, 2021

(30) Foreign Application Priority Data

Apr. 19, 2017    (IT) .................. 102017000043004

(51) Int. Cl.
*A45D 20/12*    (2006.01)
*B29B 13/06*    (2006.01)
(Continued)

(52) U.S. Cl.
CPC .............. *B29B 13/065* (2013.01); *B29B 9/16* (2013.01); *B29B 13/08* (2013.01); *F26B 3/08* (2013.01);
(Continued)

(58) Field of Classification Search
CPC ......... B29B 13/065; B29B 13/08; B29B 9/16; F26B 17/14; F26B 5/041; F26B 2200/08
(Continued)

(56) References Cited

U.S. PATENT DOCUMENTS 4,023,279 A    5/1977    Janda
5,341,576 A *  8/1994    Tsutomu ............... B29B 13/021
                                                           34/259
(Continued)

FOREIGN PATENT DOCUMENTS

CN    101738065 A    6/2010
JP    2010111032 A   5/2010
(Continued)

*Primary Examiner* — John P McCormack
(74) *Attorney, Agent, or Firm* — Volpe Koenig

(57) ABSTRACT

A process for drying granular polymeric material, comprising the steps of:
dehumidifying the granular polymeric material by means of a first flow of gas at a first temperature of between 100° C. and 150° C.;
heating the dehumidified granular polymeric material to a second temperature, greater than the first temperature;
drying the granular polymeric material heated to the second temperature, by applying a predefined vacuum level; and
transferring the dried granular polymeric material to a feed hopper (40) provided upstream of a working machine (100).

14 Claims, 1 Drawing Sheet

(51) Int. Cl.
*B29B 9/16* (2006.01)
*B29B 13/08* (2006.01)
*F26B 3/08* (2006.01)
*F26B 5/04* (2006.01)
*F26B 17/14* (2006.01)

(52) U.S. Cl.
CPC .............. *F26B 5/041* (2013.01); *F26B 17/14* (2013.01); *F26B 2200/08* (2013.01)

(58) Field of Classification Search
USPC .......................................................... 34/382
See application file for complete search history.

(56) References Cited

U.S. PATENT DOCUMENTS

| | | | |
|---|---|---|---|
| 6,745,492 B1* | 6/2004 | Haesendonckx | B29B 13/065 34/168 |
| 2009/0203840 A1* | 8/2009 | Martin | B29B 7/7485 525/50 |
| 2015/0068055 A1* | 3/2015 | Wang | B29B 13/065 34/88 |
| 2015/0316320 A1* | 11/2015 | Maguire | B29B 13/065 34/412 |
| 2021/0293479 A1* | 9/2021 | Peng | F26B 5/041 |

FOREIGN PATENT DOCUMENTS

| | | |
|---|---|---|
| WO | 0053383 A1 | 9/2000 |
| WO | 2005119151 A1 | 12/2005 |
| WO | 2007116022 A2 | 10/2007 |
| WO | 2016092404 A1 | 6/2016 |

* cited by examiner

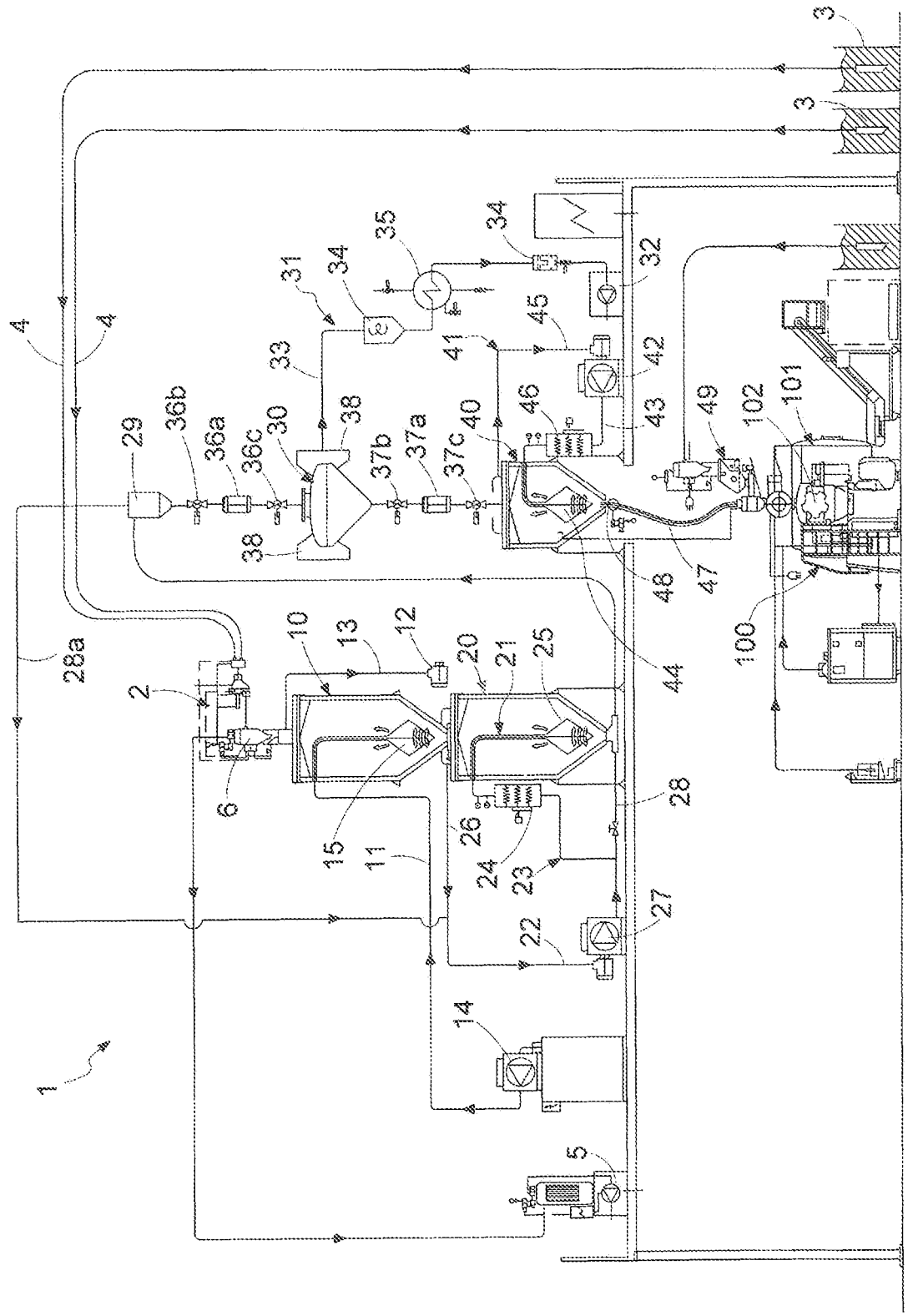

PROCESS FOR DRYING GRANULAR POLYMERIC MATERIAL AND PLANT OPERATING ACCORDING TO SAID PROCESS

TECHNICAL SCOPE

The present invention relates to a process for drying granular polymeric material having the features mentioned in the preamble of the main claim.

It further relates to a drying plant operating according to that process.

TECHNOLOGICAL BACKGROUND

The invention applies particularly to industrial processes for working plastics materials in granules by means of extrusion or moulding.

It is known that, in order to ensure an appropriate level of quality in the moulded product, these operations require the plastics material introduced into the moulds to be as humidity-free as possible.

This requirement is, however, difficult to reconcile with the high hygroscopic properties of some plastics materials that are widely used in the field, for example those based on polyethylene terephthalate (PET), polyamide (PA), polycarbonate (PC) or some copolymers such as ABS (acrylonitrile-butadiene-styrene).

These plastics materials must therefore, before being subjected to the extrusion or moulding process, be adequately dried in suitable drying plants, where the water content of the granules is reduced to the minimum amount required by the working process.

In a frequently used process, the granular polymeric material is dried inside a hopper containing the material to be dried and into which a continuous flow of hot and dry air is introduced.

Alternative drying processes require the granular polymeric material to be subjected to a predetermined degree of depressurisation (vacuum) so as to help the stripping of water from the granules at relatively low temperatures. The next step of working the dried polymeric material requires the latter to be brought to a molten or semi-molten state, so that it can be introduced into a mould or extruded through a shaped head. These processes require high energy input to melt the material, which is particularly costly if it is produced inside an extruder, such that the overall cost of the working process is largely determined by the energy input.

As a consequence, the need to find novel solutions allowing energy consumption to be reduced as far as possible is deeply felt in the relevant technical field.

For this reason too, it is desirable to feed the working machine with granular polymeric material at the highest possible temperature.

If kept at high temperatures for considerable periods of time, however, for example typically two to three hours in the drying processes, the polymeric material is subject to phenomena of oxidation and degradation. In general, for each polymer a "maximum temperature at which it can be maintained in air" is defined, and this temperature must not be exceeded in the drying process. The value of this temperature depends on the specific type of polymer and is provided by the producer of the granular material to be processed.

A further drawback of traditional drying processes arises from the long periods of time required for production changes, which affect the overall operational flexibility of the plastics material working process.

In the present description and in the attached claims, the term "granular material" means a plurality of distinct solid elements, separate from each other, having suitable shapes and sizes, depending on the working process to be carried out and the polymeric material used, including powdered or flaked polymeric material.

The expression "maximum temperature at which it can be maintained in air" means the maximum temperature at which the granular polymeric material can be maintained in air for a significant period of time without suffering from considerable degradation phenomena.

In the present description and in the attached claims, the term "dehumidification" means the process by which the humidity content of the granular polymeric material is reduced by substantially eliminating the water present on the surface region of the granules.

By way of reference, this reduction is generally of the order of about 40-60% of the initial humidity content, with residual humidity values of around 1000 ppm (parts per million).

Moreover, the term "drying" means the process by which the humidity content of the granular polymeric material is reduced to the desired values for the subsequent working phase (moulding or extrusion), by substantially eliminating the water present in the inner regions of the granules.

By way of reference, the maximum residual humidity value required by the working machine 100 can be around 50-100 ppm (parts per million).

The term "inert atmosphere" means a gas whose composition at the temperature and for the intended period of contact with the granular polymeric material does not give rise to appreciable degradation or oxidation phenomena. An example of an inert atmosphere is industrial nitrogen, which is substantially free of oxygen.

DISCLOSURE OF THE INVENTION

The problem addressed by the present invention is that of providing a process for drying granular polymeric material as well as a drying plant, which are structurally and functionally designed to overcome, at least in part, one or more of the drawbacks complained of above with reference to the prior art mentioned.

This problem is resolved by the present invention by means of a process and a plant realized according to the appended claims.

In a first aspect thereof, the invention is aimed at a process for drying granular polymeric material.

Preferably, said process comprises the step of dehumidifying the granular polymeric material by means of a first flow of gas introduced into the granular polymeric material at a first temperature.

Preferably, said first temperature is between 100° C. and 150° C.

Preferably, the dehumidified granular polymeric material is heated to a second temperature, greater than the first temperature.

Preferably, the dehumidified and heated granular polymeric material is dried by applying a predefined vacuum level.

Preferably, the dried granular polymeric material is transferred to a feed hopper of a machine for working the dried granular polymeric material.

In a second aspect thereof, the present invention refers to a plant for drying granular polymeric material.

Preferably, this plant comprises at least one dehumidification hopper capable of dehumidifying said granular polymeric material.

Preferably, the dehumidification hopper is connected to a dehumidification line, by means of which a first flow of gas is introduced into the granular polymeric material.

Preferably, the plant further comprises at least one heating hopper, positioned downstream of said dehumidification hopper and provided with a heating unit for heating the granular polymeric material to a second temperature, higher than the temperature of said first flow of gas.

Preferably, the plant further comprises a drying hopper, positioned downstream of the heating hopper and connected to a depressurisation circuit, which permits a vacuum level to be obtained in the drying hopper so as to dry the granular polymeric material.

Preferably, the plant further comprises at least one feed hopper, positioned downstream of the drying hopper and upstream of a machine for working the granular polymeric material.

Thanks to the process and the plant of the invention, the granular polymeric material is dried efficiently from the energy point of view and allows the degree of flexibility of the plant to be increased considerably.

In fact, the humidity content of the granules is reduced in two distinct, successive steps, a first step (dehumidification) in which the water fraction present on the surface region of the granules is substantially eliminated and a second step (drying) in which the water fraction present inside the granules is substantially reduced.

The dehumidification step can advantageously be carried out at a first, relatively low temperature, below the maximum temperature at which it can be maintained in air, but sufficient to cause the surface fraction of humidity to evaporate from the granules, while the granular material is further heated only before being subjected to the drying step.

The latter takes place under vacuum conditions so as to achieve particularly high drying levels in the granular material without the need to increase the temperature further.

By subdividing the process into various steps, it is also possible to make advantageous use of relatively small hoppers, which allows the granular polymeric material being processed to be changed in a short time, therefore increasing, while maintaining the same production capacity, the operating flexibility of the plant.

In at least one of the aspects mentioned above, the present invention can also have one or more of the preferred characteristics set out below.

Preferably, the first flow of gas is air taken from the environment and not recirculated air.

In particular, the first flow of gas is therefore preferably formed by air drawn from the environment, simply heated, put into contact with the granular polymeric material so as to dehumidify it and, at the end, returned to the environment.

This makes it possible to avoid costly dehumidification and recirculation treatments without significantly wasting energy, thanks to the relatively low temperature to which the gas is heated.

Preferably, the first flow of gas is heated using a heat pump.

The energy input required to heat the first air flow to the first temperature is thus minimised.

Preferably, the granular polymeric material is heated to the second temperature by means of a second flow of gas introduced into said granular polymeric material by means of a recirculation circuit.

In this way, the input of thermal energy to the gas introduced into the heating hopper is mostly recovered. On the other hand, taking account of the fact that a large part of the water content present in the granulate has been removed in the previous dehumidification stage, the gas leaving the heating hopper does not have high humidity values, and can therefore be reintroduced into the hopper (after further heating) without prior dehumidification treatment.

Preferably, the second flow of gas is formed of air.

Preferably, the second temperature to which the granular polymeric material is heated after having been dehumidified corresponds to the maximum temperature at which the granular polymeric material itself can be maintained in air.

In this way, the granular material is prepared in the subsequent vacuum drying step under the highest possible temperature conditions.

Preferably, the dehumidification step and the heating step are carried out in different hoppers, placed in series, between which the granular polymeric material is moved.

Preferably, the drying step is carried out in a suitable drying hopper, which is suitably separated from the other hoppers, both upstream and downstream, by pressure-sealing elements, capable of maintaining the vacuum level achieved inside the drying hopper.

Preferably, these pressure-sealing elements comprise respective small tanks into which the granular material entering or leaving the drying hopper is transferred, in small quantities, each tank being blocked upstream and downstream by respective shut-off valves.

Thanks to this feature it is possible to obtain very high vacuum levels, reaching an absolute pressure of less than 30 mbar, for example an absolute pressure of about 10 mbar.

Preferably, the granular polymeric material is transported from the heating hopper to the drying hopper by means of the second gas flow.

In one embodiment of the invention, the granular polymeric material is subjected to a post-heating step during or after the drying step.

Thanks to this step, the granular polymeric material can be kept at or brought to a high temperature, preferably the maximum temperature at which it can be maintained in air, so as to be ready for use in the working machine.

In one embodiment of the invention, the granular polymeric material is post-heated by irradiation with microwaves.

Conveniently, the microwave irradiation step takes place by means of a suitable irradiation unit associated with the drying hopper, and occurs during the vacuum drying step.

In another embodiment of the invention, alternatively or in addition to the previous one, the post-heating step is performed in the feed hopper.

In a preferred embodiment, the granular polymeric material is post-heated in an inert atmosphere to a temperature above the maximum temperature at which it can be maintained in air.

Preferably, the inert atmosphere is maintained within the feed hopper by means of an inert gas delivery circuit.

This allows a granular polymeric material to be introduced, downstream, into the working machine at the closest temperature to melting point. In this way, the energy input required by the working machine is lower and, in particular, the Applicant has verified that heating the granular polymeric material in the drying plant leads to an overall energy balance that is lower than heating the granular polymeric material in the working machine. This advantage is even more evident when the granular polymeric material is melted inside an extruder, where the increase of the temperature is mainly obtained from the friction developed on the granules by the action of the screw that pushes them against the inner wall.

The presence of an inert atmosphere inside the feed hopper prevents any phenomena of oxidation and degradation of the granular polymeric material, notwithstanding the high temperatures to which it is heated.

Preferably, the temperature to which the granular polymeric material is post-heated in an inert atmosphere is lower than the melting point thereof by a value of less than 50° C.

In this way it is possible to raise the temperature of the polymeric material to be introduced into the working machine to the highest possible value without, however, melting the material in the hopper.

BRIEF DESCRIPTION OF THE DRAWINGS

The characteristics and advantages of the invention will be more clearly apparent from the detailed description of a preferred exemplary embodiment thereof, illustrated by way of example and non-restrictively, with reference to the attached drawing, in which FIG. 1 is a schematic view of a plant for drying granular polymeric material realised so as to operate according to the process of the present invention.

PREFERRED EMBODIMENTS OF THE INVENTION

With reference to FIG. 1, the reference numeral 1 is an overall indication of a plant for drying granular polymeric material, operating according to the process of the present invention.

The plant 1 is designed to dry any granular polymeric material, for example polyamide, polycarbonate or ABS copolymer, even though, in the specific example described here, the material treated is formed of PET (polyethylene terephthalate) granules.

PET has a melting point of around 260° C. and a maximum temperature at which it can be maintained in air, as generally provided by the producers, of around 180° C.

The plant 1 is designed to supply a working machine 100 of the granular polymeric material, which machine, in the specific example, comprises a mould 101 fed by an extruder 102 that injects the polymeric material into the mould 101 in the molten state.

The plant 1 comprises a dehumidification hopper 10, a heating hopper 20, a drying hopper 30 and a feed hopper 40, all positioned in series with one another. The working machine 100 is placed downstream of the feed hopper 40.

In the example described here, a single hopper is provided for each step of the drying process; however, two or more hoppers can also be provided in parallel for one or more of said steps.

By way of example only, for a production capacity of the plant 1 of around 1000 kg/h, the dehumidification and heating hoppers 10, 20 may have a volume of between 1000 and 1500 litres, and the drying and feed hoppers 30, 40 may have a volume of between 500 and 1000 litres.

The plant 1 comprises a filling unit 2 provided for transferring the granular material from one or more bags 3 of untreated material into the dehumidification hopper 10, via a filling line 4. The bags 3 can contain the same material, or different polymeric materials.

The filling unit 2 comprises an extractor 5 connected to the filling line 4, and a separation cyclone 6, placed at the top of the dehumidification hopper 10, at which point the granules of polymeric material separate from the transport air flow and are introduced into the hopper.

The dehumidification hopper 10 is connected to a dehumidification line 11, through which a first flow of gas for dehumidifying the granular polymeric material contained in the dehumidification hopper 10 is introduced.

The first gas flow is formed by ambient air drawn along the dehumidification line 11 by the action of a fan 12 placed on an outlet pipe 13 of the dehumidification hopper 10.

A heat pump 14 is provided on the dehumidification line 11, for heating the first flow of gas to a first temperature preferably between 120° C. and 130° C., before feeding it into the dehumidification hopper 10. The first gas flow is distributed into the mass of granular polymeric material to be dehumidified thanks to a diffuser 15 placed inside the dehumidification hopper 10 and, once it leaves the dehumidification hopper 10 by being extracted by the fan 12, is returned to the atmosphere without being recirculated.

The heating hopper 20 is placed directly under the dehumidification hopper 10, so that the dehumidified granular material can be transferred into the heating hopper 20 by falling directly into it.

The dehumidification hopper 20 is provided with a heating unit 21, for heating the granular polymeric material to a second temperature, higher than the temperature achieved in the dehumidification hopper 10, for example around 180° C.

The heating unit 21 comprises a recirculation circuit 22, through which a second flow of gas is fed, also in this case formed of ambient air.

The recirculation circuit 22 comprises a heating line 23, along which a heater 24 is provided, which heating line enters the heating hopper 20 and emerges into a diffuser 25, conveniently positioned close to the bottom of the heating hopper 20.

The recirculation circuit 22 further comprises a recovery line 26 leaving the heating hopper 20 and a fan 27 that drives the second gas flow back along the heating line 23.

A transfer line 28 branches off from the heating line 23 before the heater 24, the transfer line being connected to the bottom of the heating hopper 20 and designed to pneumatically convey the granular polymeric material leaving the heating hopper 20 to an intermediate holding hopper 29, from which a return line 28a starts, carrying the second gas flow back to the fan 27.

The intermediate holding hopper 29 acts as a small buffer tank from which the drying hopper 30 is fed.

The drying hopper 30 is connected to a depressurisation circuit 31 capable of producing and maintaining a predefined vacuum level inside the drying hopper 30, for example so as to reach a pressure of less than 30 mbar, preferably around 10 mbar.

The depressurisation circuit 31 comprises a vacuum pump 32, connected to a depressurisation line 33 in which a pair of filters 34 and a protective condenser 35 are provided.

Upstream and downstream of the drying hopper 30, a filling unit and a discharge unit for the hopper are provided respectively.

The filling unit of the drying hopper 30 comprises a small tank 36a, blocked upstream and downstream by respective shut-off valves 36b and 36c, which function overall as pressure-sealing elements.

Similarly, the discharge unit of the hopper comprises a small tank 37a, blocked upstream and downstream by respective shut-off valves 37b and 37c, which are also designed overall to operate as pressure-sealing elements. Such high vacuum levels, equal to an absolute pressure of around 10 mbar, can be achieved thanks to the provision, upstream and downstream of the drying hopper 30, of the tanks 36a and 37a that are in turn sealed by pairs of shut-off valves 36b, 36c and 37b, 37c.

In the embodiment described here, a microwave irradiation unit 38 is provided in the drying hopper 30, capable of heating the granular polymeric material contained therein.

Preferably, the microwave irradiation unit 38 comprises one or more Magnetron-type sources that are sufficiently powerful to keep the temperature of the granular polymeric material at the maximum temperature at which it can be maintained in air, for example, in the case of PET, at around 180° C.

The feed hopper 40 is connected to a circuit for delivering inert gas 41, provided with a fan 42, mounted on an intake line 43 that enters the feed hopper 40, emerging into a distributor 44, and a return line 45 that returns the inert gas leaving the feed hopper 40 to the fan 42.

A heater 46 is positioned on the feed line 43.

The feed hopper 40 is connected to the processing machine 100 by means of a discharge pipe 47 fixed to the bottom of the feed hopper 40 by means of a metering valve 48.

A metering device 49 is also connected to the discharge pipe 47 in order to measure out, if required, any additives to the granular polymeric material that are fed into the processing machine 100.

The plant 1 operates according to the process described below.

The granular polymeric material, for example PET, is fed into the dehumidification hopper 10 by means of the filling unit 2, where it is dehumidified by contact with the first flow of air introduced into the dehumidification hopper 10 via the dehumidification line 11.

The temperature of the first air flow introduced into the dehumidification hopper 10 is around 120-130° C. Once it leaves the dehumidification hopper 10, the first air flow is returned to the environment.

The dehumidification step lasts around 120 minutes, at the end of which the granular polymeric material has a humidity content of around 1000 ppm and a temperature of around 120-130° C.

The dehumidified granular polymeric material is then discharged by gravity into the heating hopper 20, where it is brought to the maximum temperature at which it can be maintained in air, equal to around 180° C., thanks to contact with the second air flow fed via the recirculation circuit 22.

The air introduced into the heating hopper is recirculated without being dried, and thereby the action of dehumidifying the granular polymeric material is overall less comprehensive than the previous dehumidification step.

At the end of the heating step, the dehumidified and heated granular polymeric material is gradually transferred to the drying hopper 30, using the pneumatic transport provided by the transfer line 28 to the intermediate holding hopper 29.

From this, the material passes to the filling unit of the drying hopper, the shut-off valve 36b placed upstream of the tank 36a being opened, while the shut-off valve 36c placed downstream of the tank 36a is kept shut.

The tank 36a is small, for example around 30-50 litres, and the material it contains is transferred to the drying hopper by opening the shut-off valve 36c after having closed the shut-off valve 36b.

The material is then transferred to the drying hopper 30 a little at a time, to avoid excessive variations in the vacuum level inside the drying hopper 30. In the drying hopper 30, the residual pressure is less than 30 mbar, preferably around 10 mbar and this, together with the high temperature, results in effective deabsorption of the humidity present inside the granules. After a suitable treatment period, for example around 40-50 minutes, the granular polymeric material has a residual humidity content of less than about 30 ppm.

During the drying step, the granular polymeric material is post-heated by the microwave irradiation unit 38, to keep the temperature of the material at the temperature of 180° C.

The dried material is then transferred to the feed hopper 40, passing through the discharge unit and the tank 37a after alternate closing and opening of the shut-off valves 37b and 37c.

In the feed hopper 40, the dried material can be further post-heated by a flow of inert gas, for example nitrogen, introduced into the feed hopper 40 via the delivery circuit 41.

The inert gas is introduced at a temperature of around 220-230° C., higher than the maximum temperature at which it can be maintained in air (180° C.) and about 30-40° C. below the melting point of PET (260° C.).

The granular polymeric material is then transferred to the processing machine 100 through the discharge pipe, actuating the metering valve 48.

The plant of the present invention can be produced in variations differing from the preferred example described above.

In a first variant, provision is made not to provide the feed hopper 40 of the delivery circuit with inert gas 41.

In this case, the granular polymeric material is fed into the processing machine at the maximum temperature at which it can be maintained in air, which the granular polymeric material already has when it reaches the feed hopper 40, thanks to the post-heating carried out by the microwave radiation unit 38.

In a second variant, provision is made for the delivery circuit 41 to be supplied with air instead of inert gas.

In this case too, the granular polymeric material is fed into the processing machine at the maximum temperature at which it can be maintained in air.

In this case, it is possible to heat the granular polymeric material contained in the feed hopper if its temperature tends to fall during its dwell time or if it is not sufficiently heated in the drying hopper, so as to supplement the heating of the microwave irradiation.

In a third variant, provision is made to eliminate the microwave irradiation unit 38.

In this case, the post-heating phase takes place only in the feed hopper 40, where it can be carried out with air or inert gas depending on the desired final temperatures.

Thanks to the process and plant of the present invention, it is possible to obtain excellent results in terms of drying the granular polymeric material while optimising the energy efficiency of the process.

Moreover, the plant can change production in a very short period of time, around two hours as against the six hours required in traditional drying plants (with the same production capacity).

A further important advantage results from the fact that, when the processing machine is fed with a granular polymeric material at a temperature above the maximum temperature at which it can be maintained in air, the energy efficiency of the processing machine is increased.

Moreover, if the granular polymeric material is fed into an extruder, the latter can be given dimensions with a smaller footprint and power, so as to further improve the layout of the plant as well as the energy efficiency.

The invention claimed is:

1. A process for drying granular polymeric material, comprising:
   dehumidifying said granular polymeric material by a first flow of gas introduced into said granular polymeric material at a first temperature of between 100° C. and 150° C.;
   heating said dehumidified granular polymeric material to a second temperature that is greater than said first temperature;
   drying said granular polymeric material heated to said second temperature by applying a predefined vacuum level; and
   transferring said dried granular polymeric material to a feed hopper (40) that is provided upstream of a machine (100) for working said granular polymeric material, wherein said first flow of gas is air that is taken from the environment and is not recirculated and wherein said granular polymeric material is heated to said second temperature by a second flow of gas introduced, without prior dehumidification, into said granular polymeric material by a circuit (22) for recirculating said second flow of gas.

2. The process according to claim 1, wherein said first flow of gas is heated using a heat pump (14).

3. The process according to claim 1, wherein said drying process is carried out in a drying hopper (40) that is separated from the other hoppers, both upstream and downstream, by pressure-sealing elements.

4. The process according to claim 1, wherein said drying step is carried out in a drying hopper (40), and wherein said granular polymeric material is transported by said second flow of gas.

5. The process according to claim 1, wherein said granular polymeric material is subjected to a post-heating step either during or after said drying step.

6. The process according to claim 5, wherein said granular polymeric material is post-drying heated by irradiation with microwaves.

7. The process according to claim 6, wherein said microwave irradiation is carried out during said drying step.

8. A process for drying granular polymeric material, comprising:
   dehumidifying said granular polymeric material by a first flow of gas introduced into said granular polymeric material at a first temperature of between 100° C. and 150° C.;
   heating said dehumidified granular polymeric material to a second temperature that is greater than said first temperature;
   drying said granular polymeric material heated to said second temperature by applying a predefined vacuum level; and
   transferring said dried granular polymeric material to a feed hopper (40) that is provided upstream of a machine (100) for working said granular polymeric material, wherein said granular polymeric material is subjected to a post-heating step, after drying, which is carried out in said feed hopper.

9. The process according to claim 5, wherein said granular polymeric material is post-drying heated in an inert atmosphere to a temperature above a maximum temperature at which it can be maintained in air.

10. The process according to claim 9, wherein said granular polymeric material is post-drying heated in an inert atmosphere to a temperature with a value which is less than 50° C. lower than the melting temperature of said granular polymeric material.

11. A plant for drying granular polymeric material, comprising:
   at least one dehumidification hopper (10), which is connected to a dehumidification line (11), through which a first flow of gas for dehumidifying said granular polymeric material is introduced into said dehumidification hopper;
   at least one heating hopper (20), which is arranged downstream of said dehumidification hopper and is provided with a heating unit (21), for heating said granular polymeric material to a second temperature that is higher than the temperature of said first flow of gas;
   at least one drying hopper (30), which is provided downstream of said heating hopper and is connected to a depressurization circuit (31), for obtaining a specified vacuum level in said drying hopper and for drying said granular polymeric material; and
   at least one feed hopper (40), which is provided downstream of said drying hopper and upstream of a machine (100) for working said granular polymeric material, wherein said first flow of gas is air that is taken from the environment and is not recirculated and wherein said granular polymeric material is heated to said second temperature by a second flow of gas introduced, without prior dehumidification, into said granular polymeric material by a circuit (22) for recirculating said second flow of gas.

12. The drying plant according to claim 11, wherein said drying hopper is associated with a microwave-irradiating unit (38) for heating said granular polymeric material.

13. The drying plant according to claim 11, wherein a heating unit (46) is also provided in said feed hopper (40).

14. The drying plant according to claim 13, wherein said feed hopper (40) is connected to an inert gas circuit (41).

* * * * *